United States Patent Office 2,817,576
Patented Dec. 24, 1957

2,817,576

PREPARATION OF CUPROUS FLUORIDE

David A. McCaulay, Chicago, Ill., assignor to Standard Oil Company, Chicago, Ill., a corporation of Indiana No Drawing. Application February 6, 1956
Serial No. 563,449

13 Claims. (Cl. 23—88)

This invention relates to the preparation of cuprous fluoride.

Cuprous fluoroborate has been discovered to be of value in the separation of aromatic hydrocarbons from non-aromatic hydrocarbons. The reaction of boron trifluoride and cuprous fluoride is a particularly suitable way of preparing cuprous fluoroborate. Solid cuprous fluoroborate is not available commercially.

An object of the invention is cuprous fluoride. Another object of the invention is a method of preparing cuprous fluoride. Still another object of the invention is a method of preparing cuprous fluoride directly from copper metal. Other objects will become apparent in the course of the detailed description of the invention.

It has been found that cuprous fluoride is obtained by the decomposition of cuprous fluoroborate. Theoretically cuprous fluoroborate can be made by reacting copper metal, hydrogen fluoride and boron trifluoride; actually this reaction, if it occurs at all, is too slow to be of any value. It has been found that the presence of an aromatic hydrocarbon in a vessel containing copper metal, liquid hydrogen fluoride and boron trifluoride causes a very rapid reaction producing hydrogen gas and a liquid HF solution of a cuprous fluoroborate-aromatic hydrocarbon complex. When the liquid HF is distilled away from the complex and unreacted copper metal, if any, cuprous fluoride is obtainable by heating the complex to a temperature high enough to drive off the $BF_3$ from the complex. If a high enough temperature is used, not only the $BF_3$ but also the aromatic hydrocarbon are distilled away from the cuprous fluoride product. If a lower temperature or sufficient pressure is maintained on the decomposition zone, aromatic hydrocarbon and cuprous fluoride remain in the decomposition zone after the removal of $BF_3$.

The copper metal used is preferably of very high purity. Commercial grades of copper metal suitable for use in electrical work are of sufficient purity for use herein. The copper metal may be in the form of powder, fine wire, foil, etc. Pellets or granules may be utilized if the rate of reaction is not of particular importance. The rate of reaction is dependent upon the amount of surface area presented by the copper metal, the amount of agitation imparted to the reaction zone and also the temperature at which the reaction is carried out. It is preferred to operate with copper powder as the reaction material.

The boron trifluoride reactant may be derived either from the cylinders available commercially or from chemical reactions producing the gas. The $BF_3$ should be essentially free of water. One mole of $BF_3$ is present in each mole of cuprous fluoroborate. Thus the amount of cuprous fluoroborate formed in the reaction zone is directly dependent on the amount of $BF_3$ present therein up to one mole of $BF_3$ per mole of copper metal present. It appears that the use of more $BF_3$ is neither detrimental nor beneficial in any readily apparent fashion.

The cuprous fluoroborate requires one atom of fluoride ion in addition to the three gram atoms present in the $BF_3$ component. This fluoride ion is obtained from liquid hydrogen fluoride present in the reaction zone. In order to maximize the yield of cuprous fluoroborate, one mole of hydrogen fluoride must be present per mole of copper metal present (one mole of $BF_3$ must also be present per mole of copper metal.)

The presence of an aromatic hydrocarbon in the reaction zone containing copper, HF and $BF_3$ results in a rapid reaction as evidenced by the evolution of hydrogen gas or increase in pressure in an inclosed sysem. It is believed that a complex is formed consisting of cuprous fluoroborate and the aromatic hydrocarbon. It is believed that the complex is extremely soluble in liquid HF and that the function of the aromatic hydrocarbon is to dissolve the cuprous fluoroborate produced by the direct reaction of copper, HF and $BF_3$ and thereby continuously expose fresh surface to the reaction. For this reason, sufficient liquid HF should be present to dissolve all the complex formed as well as to participate in the reaction itself. When using about one mole of $BF_3$ and about one mole of aromatic hydrocarbon per mole of copper in the reaction zone, between at least about 6 moles and about 30 moles of HF per mole of copper are desired in the reaction zone. Preferably between about 10 and 15 moles of HF are used. The liquid hydrogen fluoride must be substantially anhydrous, i. e., contain less than about 5 weight percent of water. Commercial grade anhydrous hydrofluoric acid which contains about 2–3 weight percent of water is particularly suitable. In order to maintain the substantially anhydrous condition of the liquid HF, the entire operation is carried out under substantially anhydrous conditions.

It is necessary that the HF be in the liquid state in the course of the reaction in order to dissolve the complex produced. Therefore, sufficient pressure must be maintained on the complex-producing reaction zone to maintain the liquid HF in the liquid state. It is to be understood that any vapor space present in the reaction zone will naturally contain HF gas to the extent determined by the partial pressure of the liquid HF at the particular temperature used in the complex-forming reaction.

The aromatic hydrocarbon may be a benzene hydrocarbon or a polycyclic hydrocarbon containing at least one benzene ring. For example, the aromatic hydrocarbons may be benzene hydrocarbons such as benzene, toluene, ethylbenzene, a xylene isomer, a trimethylbenzene isomer, a tetramethylbenzene isomer, pentamethylbenzene, hexamethylbenzene, ethylbenzene or any one of the ethylbenzenes corresponding to the above methylbenzenes. Benzene hydrocarbons containing substituents such as propyl groups, butyl groups or pentyl groups, etc. may also be used.

The naphthalene hydrocarbons, such as naphthalene, ethylnaphtalene, methylnaphthalene, isopropylnaphthalene, etc. may be utilized. Aromatic hydrocarbons of the anthracene series may be utilized. The hydronaphthalenes, such as tetralin, may be used in the process. The various indane derivatives may also be used in the reaction.

The benzene hydrocarbons selected from the class consisting of benzene, toluene, ethylbenzene and xylene or mixtures thereof are particularly suitable. It is preferred to utilize toluene.

The presence of even a trace amount of aromatic hydrocarbon will result in the formation of the desired product to the extent of the aromatic hydrocarbon usage taken in connection with the HF and $BF_3$ present. In general, it is desirable to use at least about one mole of aromatic hydrocarbon per mole of copper metal. Maximum yields, assuming other conditions are maximized, result when using about 2 moles of aromatic hydrocarbon per mole of copper metal charged. More aromatic hydrocarbon may be used without detrimental effect.

The initial formation of what is believed to be the cuprous fluoroborate-aromatic hydrocarbon complex occurs when copper metal, liquid HF, $BF_3$ and the aromatic hydrocarbon are contacted, under substantially anhydrous conditions. The contacting may be carried out over a wide temperature range as long as sufficient pressure is maintained on the system to keep the HF in the liquid state. In general, what is spoken of as the complex formation reaction takes place at temperatures between about 0° and 150° C. Sufficient time must be given to the contacting to permit reaction to take place as evidenced by the production of hydrogen gas and particularly substantial amounts of hydrogen gas. The time may be from about 5 minutes to 24 hours. The temperature of contacting has a considerable bearing on the time of contacting. When utilizing sufficient reactants to react with all the copper present, the longer time of contacting corresponds substantially to the lower temperatures. Thus at 150° C., about 5 minutes time will result in substantial completion of the reaction. It is preferred to operate at a temperature between about 20° C. and about 30° C.; at these temperatures, the time to obtain substantial completion of the reaction is between about 2 hours and 6 hours wherein 6 hours corresponds to about 20° C. and 2 hours corresponds to about 30° C.

When the reaction is complete, as evidenced by cessation of the evolution of hydrogen, the HF is removed from the reaction zone. In the simplest fashion, the HF is distilled away. The material remaining in the reaction zone after the HF has been distilled away is then heated to a temperature sufficient to distill off all the $BF_3$ component of the cuprous fluoroborate formed. In general, the decomposition of the fluoroborate proceeds at a good rate at temperatures above about 100° C. at atmospheric pressure. The temperature of decomposition may be as much as 200° C. or even higher. The pressure on the system during the fluoroborate decomposition has a considerable bearing on the rate of decomposition. In general, it is preferred to decompose the cuprous fluoroborate complex at a temperature between about 100° and about 150° C. using some vacuum on the reaction zone.

When the $BF_3$ has been completely removed from the decomposition zone there will remain behind any unreacted copper metal, cuprous fluoride product and possibly some aromatic hydrocarbon. If the decomposition is carried out at a temperature and pressure sufficient to boil off all the aromatic hydrocarbon, only solid materials, cuprous fluoride or unreacted copper and cuprous fluoride will remain in the decomposition zone. If all the aromatic hydrocarbon has not been boiled off, the cuprous fluoride may be readily recovered from the aromatic hydrocarbon by filtration. By the use of at least the theoretical amounts of HF and $BF_3$ and at least about 2 moles of aromatic hydrocarbon per mole of copper, there is recovered from the decomposition zone essentially pure cuprous fluoride (CuF).

The preparation of cuprous fluoride by the technique of the invention and attempted preparations by similar techniques is illustrated by the following tests. In all of these tests, the reactants were placed in a Hasteloy autoclave provided with a mechanical stirrer and a pressure gauge. The necessary apparatus for controlling the temperature within the autoclave was also present. It is possible to withdraw and measure the withdrawal of HF, $BF_3$, and hydrogen and aromatic hydrocarbon vapor.

*Test 1*

In this test, it was attempted to prepare cuprous fluoride by the reaction of copper turnings and commercial grade anhydrous hydrogen fluoride containing about 99% HF. After several hours heating at elevated temperature, there was no evidence of reaction.

*Test 2*

In this test, it was attempted to produce cuprous fluoroborate by the reaction of 63.5 grams of copper turnings, 350 ml. of liquid HF, and 110 grams of $BF_3$. After 3 hours of stirring at elevated temperature, there was no evidence of reaction. The pressure in the reactor throughout this time remained at a constant 260 p. s. i. g.

*Test 3*

To the autoclave containing the materials of Test 2, there was added a solution consisting of toluene, 77 grams, and n-heptane, 122 grams. The pressure in the autoclave immediately rose to 300 p. s. i. g. Mass spectrometer analysis of the gaseous phase present in the autoclave showed that hydrogen gas had been formed. Withdrawal of the contents showed that two liquid phases were present in the autoclave. The upper phase consisted entirely of n-heptane. The lower phase consisted of liquid HF containing the toluene as well as reaction products of copper, HF and $BF_3$.

*Test 4*

In this test, copper powder, 31 grams, liquid HF, 80 grams, $BF_3$, 23 grams, and toluene, 86 grams, were stirred at 25° C. for about 5 hours. Hydrogen fluoride distilled out of the autoclave at 25° C. under vacuum until all of the theoretical remainder had come over. Toluene was distilled over at 40° C. under vacuum until one mole of toluene had come over per mole of copper present. The remainder in the autoclave corresponded to cuprous fluoroborate-toluene in a mole ratio of 1 to 1. The temperature of the autoclave was raised to 110° C. and vacuum maintained thereon for about 2.5 hours. At this time, all of the $BF_3$ charged had been recovered and also all of the toluene remaining. The autoclave was opened and found to contain 37.5 grams of a brown crystalline powder corresponding to the theoretical yield of cuprous fluoride (CuF).

*Test 5*

In this test, it was attempted to make cuprous fluoride by the direct reaction of copper and hydrogen fluoride in the presence of benzene. Six grams of copper turnings, 75 grams of liquid hydrogen fluoride and 26 grams of benzene were stirred in the autoclave for 3 days. No change in pressure occurred within the autoclave. At the end of the 3 days, the vessel was opened and the HF, benzene and copper were recovered unchanged.

*Test 6*

In this test, 10 grams of copper turnings, 69 grams of liquid HF, 34 grams of $BF_3$ and 26 grams of benzene were stirred in the autoclave for 4 hours at room temperature. Constant pressure was maintained on the autoclave by bleeding off gas. The gas was passed through a liquid nitrogen trap and a soda-lime tube. Mass spectrometer analysis of the gas showed it to be pure hydrogen. The amount of hydrogen gas formed corresponded to one-half mole of hydrogen (1 gram atom) per mole of copper present. At the end of the 4 hours, the reactor was heated to 190° C., and the HF, $BF_3$ and benzene were recovered. On the basis of the materials recovered from the reactor, it was calculated that 0.15 mole of cuprous fluoride should have been formed. The autoclave was opened and found to contain a brown crystalline powder amounting to 12 grams or, within the error of determination, an amount of material corresponding to the theoretical production of cuprous fluoride.

*Test 7*

In this test, copper metal, liquid HF, $BF_3$, and meta-xylene were reacted. The material remaining in the reactor after the hydrogen gas and HF had been removed was maintained at about 100° C. for several hours; the vapors formed were continuously pumped away. The meta-xylene, BF₃ recovery and hydrogen gas recovery showed that a theoretical yield of material corresponding to cuprous fluoride has been obtained.

Test 8

This test was carried out in a manner similar to the other tests except that the aromatic hydrocarbon used was methylnaphthalene. Once again a brown crystalline powder was obtained which corresponded to about the theoretical yield of cuprous fluoride.

Test 9

Wartenburg has compiled all of the then known procedures for the preparation of cuprous fluoride (Z. Anorg. Allgem. Chem. 241, 381 (1939)). He himself was unable to produce solid cuprous fluoride. His product consisted of an equimolar mixture of copper metal and cupric fluoride ($CuF_2$). An analysis of the product produced by the previously known procedures as repeated by him showed that the product was not cuprous fluoride, rather it was an equimolar mixture of copper metal and cupric fluoride. He was able to prepare cuprous fluoride in the molten state. However, the liquid cuprous fluoride always decomposed to form a mixture consisting of copper metal and cupric fluoride when the liquid was cooled; quenching the liquid did not prevent this decomposition.

An attempt to prepare cuprous fluoride by direct reaction between fluorine and copper is reported in J. Inorg. Nuclear Chem. 1, 213–17, (1955). The films produced by the fluorine on the copper metal were examined microscopically and by electron diffraction. (No cuprous fluoride was detected.)

A sample of the brownish crystals prepared in Test No. 6 was subjected to X-ray diffraction study. The X-ray diffraction pattern showed that neither copper metal nor cupric fluoride was present. X-ray powder diffraction patterns are available for copper and cupric fluoride. No standard reference patterns correspond to the pattern of the sample showing that the sample is a previously unknown compound. The stoichiometric calculations of the reaction, taken with the X-ray diffraction pattern, show that solid cuprous fluoride, free of copper and cupric fluoride, is prepared by the method set out herein.

The above tests show that by the method of this invention it is possible to readily obtain theoretical yields of cuprous fluoride by the ultimate reaction of copper metal and hydrogen fluoride, since the BF₃ and the aromatic hydrocarbon utilized are recovered unchanged and may be recycled to the initial reaction zone.

Thus having described the invention, what is claimed is:

1. A method of preparing cuprous fluoride which comprises contacting copper metal, liquid hydrogen fluoride, boron trifluoride and an aromatic hydrocarbon, under substantially anhydrous conditions, for a time sufficient to produce a cuprous fluoroborate-aromatic hydrocarbon complex, as evidenced by the production of hydrogen gas, said liquid hydrogen fluoride being present in an amount at least sufficient to participate in the reaction forming cuprous fluoroborate and also to dissolve said complex, separating said liquid HF solution from unreacted materials, and obtaining solid cuprous fluoride by heating said solution to remove HF and to decompose said complex by driving off the BF₃ portion thereof.

2. The method of claim 1 wherein said hydrocarbon is benzene.

3. The method of claim 1 wherein said hydrocarbon is toluene.

4. The method of claim 1 wherein said hydrocarbon is xylene.

5. The method of claim 1 wherein said hydrocarbon is methyl naphthalene.

6. A method of preparing cuprous fluoride which comprises contacting copper metal, at least about 1 mole of aromatic hydrocarbon per mole of copper, at least about 1 mole of BF₃ per mole of copper and at least about 6 moles of liquid HF per mole of copper, under substantially anhydrous conditions, for a time sufficient to produce a cuprous fluoroborate-aromatic hydrocarbon complex dissolved in liquid hydrogen fluoride, distilling HF away from said complex and decomposing said complex by heating to recover cuprous fluoride.

7. The method of claim 6 wherein said complex-forming reaction takes place at a temperature between about 0° and 150° C. at a pressure sufficient to maintain said HF in the liquid state.

8. The method of claim 6 wherein said copper fluoroborate-aromatic hydrocarbon complex is decomposed by heating to a temperature between about 100° C. and 200° C. for a time sufficient to drive off all of the BF₃ component.

9. The method of claim 6 wherein said aromatic hydrocarbon is selected from the class consisting of benzene, toluene, ethylbenzene and xylene.

10. A method of preparing cuprous fluoride which comprises contacting copper metal, about 2 moles of hydrocarbons selected from the class consisting of benzene, toluene, ethylbenzene and xylene, per mole of said copper, between about 6 and 30 moles of hydrogen fluoride per mole of said copper and at least 1 mole of BF₃ per mole of said copper, under substantially anhydrous conditions, at a temperature between about 0° and 150° C. for a time between about 5 minutes and 24 hours, the longer times corresponding substantially to the lower temperatures, at a pressure sufficient to maintain said hydrogen fluoride in the liquid state, whereby a cuprous fluoroborate-hydrocarbon complex is formed, distilling HF away from said complex, heating said complex to a temperature between about 100° C. and 200° C. for a time sufficient to drive off all of the BF₃ component of said complex and recovering cuprous fluoride from said decomposition zone.

11. The method of claim 10 wherein said temperature of complex formation is between about 20° C. and 30° C. and said time is between about 2 hours and 6 hours.

12. The method of claim 10 wherein said decomposition temperature is between about 100° C. and 150° C.

13. The method of claim 10 wherein said hydrocarbon is toluene.

References Cited in the file of this patent

J. W. Mellor's "A Comprehensive Treatise on Inorganic and Theoretical Chem.," vol. 3, 1923 ed., page 154, Longmans, Green and Co., New York.

"Handbook of Chemistry and Physics," 16th ed., pages 234–235, Chemical Rubber Publishing Co., Cleveland, Ohio.